United States Patent
Pawar et al.

(10) Patent No.: US 9,913,187 B1
(45) Date of Patent: Mar. 6, 2018

(54) ADAPTIVE BIT RATE STREAMING BASED ON LIKELIHOOD OF TUNING AWAY

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/366,507

(22) Filed: Dec. 1, 2016

(51) Int. Cl.
  *H04W 36/14* (2009.01)
  *H04L 29/06* (2006.01)
  *H04W 36/30* (2009.01)
  *H04W 68/02* (2009.01)

(52) U.S. Cl.
  CPC ........... *H04W 36/14* (2013.01); *H04L 65/601* (2013.01); *H04L 65/607* (2013.01); *H04W 36/30* (2013.01); *H04W 68/02* (2013.01)

(58) Field of Classification Search
  CPC ............... H04W 72/042; H04W 88/06; H04W 72/1263; H04W 36/14; H04W 68/02; H04W 72/005; H04W 76/025; H04W 72/1215; H04W 68/005; H04W 28/02; H04W 36/0083; H04W 72/04; H04W 72/044; H04W 36/30; H04L 65/607; H04L 65/601
  See application file for complete search history.

(56) References Cited

U.S. PATENT DOCUMENTS

| | | | |
|---|---|---|---|
| 7,164,926 B2 * | 1/2007 | Papadimitriou | H04W 68/00 455/422.1 |
| 9,088,925 B1 | 7/2015 | Chen | |
| 2011/0116473 A1 * | 5/2011 | Shaheen | H04L 65/1093 370/331 |
| 2014/0349646 A1 * | 11/2014 | Su | H04W 76/048 455/436 |

OTHER PUBLICATIONS

Adaptive bitrate streaming, Wikipedia, available at https://en.wikipedia.org/wiki/Adaptive_bitrate_streaming, last accessed Aug. 5, 2016.

* cited by examiner

*Primary Examiner* — Daniel Lai

(57) ABSTRACT

Example methods and an example controller for controlling a bit rate at which a media server streams media content to a UE are provided. The example controller includes at least one processing unit and data storage having instructions executable by the processing unit to carry out operations. The operations include determining an extent to which the UE is configured to tune away from a first RAN to a second RAN to check for pages. Further, the operations include, based on the determined extent, (i) establishing the bit rate and (ii) causing the media server to stream the media content to the UE at the established bit rate.

20 Claims, 4 Drawing Sheets

ADAPTIVE BIT RATE STREAMING BASED ON LIKELIHOOD OF TUNING AWAY

BACKGROUND

A typical wireless communication system includes one or more base stations, each radiating to define one or more coverage areas, such as cells and cell sectors, in which user equipment devices (UEs) such as cell phones, tablet computers, tracking devices, embedded wireless modules, and other wirelessly equipped communication devices (whether or not user operated), can operate. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the one or more coverage areas of such a system may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define downlink control channels for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system, the UE may detect a reference signal and read system information broadcast from a base station. The UE may then engage in a process to register itself with the base station. For instance, the UE may transmit an attach or registration message on an uplink control channel to the base station, and the base station and/or supporting infrastructure may then responsively authenticate and authorize the UE for service, establish a record indicating where in the system the UE is operating, establish local profile or context records for the UE, and provide an attach accept or registration response message to the UE. Thereafter, the UE may then be served by the system in an idle mode or a connected/active mode. In the idle mode, the UE may monitor a downlink control channel to check for page messages and other information regarding incoming communications and may similarly transmit uplink control signaling to initiate communications or for other reasons. In the connected/active mode, the UE may have particular traffic channel resources assigned by the base station, which the UE may use to engage in communication of bearer traffic and the like.

Further, in such wireless communication systems, a media server sometimes communicates streaming media content to UEs, and therefore, base stations sometimes transmit streaming media content to their served UEs. Such streaming media content may include audio and/or video. While a UE is receiving streaming media content, variations in network conditions can adversely affect the user experience. For example, if the available bandwidth suddenly decreases, a user of the UE may notice a degradation in media stream quality, such as a media stream that stalls or buffers.

Adaptive bit rate streaming is one technique to reduce such problems. Adaptive bit rate streaming works by adjusting in real time the bit rate of the streaming media content based on knowledge of a UE's wireless conditions. The bit rate refers to the number of bits that are conveyed or streamed per unit of time (e.g., number of bits per second).

In one implementation, an encoder encodes a particular instance of media content at multiple bit rates, yielding multiple versions of the instance of media content each having a different bit rate. For instance the encoder may establish different versions having different bit rates by changing the frame rate and/or resolution at which each version is encoded.

Further, to stream the instance of media content to the UE, the media server then selects an appropriate version of the instance of media content, and communicates the selected version to the UE. As the media server streams the instance of media content to the UE, the media server may switch between streaming different versions to the UE depending on the UE's wireless conditions. For example, initially, the media server may stream a version of the instance of media content with a first bit rate. As the UE receives streaming media content from the media server, the UE or the UE's serving base station may send a message to the media server regarding the UE's RF conditions. And if, for instance, the UE's RF conditions degrade, the media server may switch to streaming a version of the instance of media content that is encoded at a lower bit rate than the first bit rate. Adjusting the bit rate over time may reduce buffering time and allow faster starting times. Further, the ability to adjust the bit rate for different UEs may enable the media server to provide good user experiences for both UEs with good wireless conditions and UEs with poorer wireless conditions.

Overview

In some areas, service providers may operate a hybrid wireless communication system that includes at least two radio access networks (RANs) and functionality to interwork between the RANs. In such an arrangement, a UE may acquire connectivity with and be served by one of the RANs and may at some point transition to instead connect with and be served by another of the RANs.

An example of such a hybrid wireless communication system is one that includes a first RAN providing LTE service to support mobile broadband data communication and a second RAN providing legacy CDMA or GSM service to support traditional voice calls and/or other services. In such a system, a UE may connect with and be served by the LTE network by default, to facilitate engaging in data communication, and the UE may then transition to be served by the legacy network when necessary to engage in a voice call or other legacy network service.

To facilitate this, a UE that registers with and is served by the LTE network in an idle or connected mode may also separately register with the legacy network so that the UE can place and receive calls as necessary. There are at least two approaches for doing this in practice.

In a first approach, the UE registers with the legacy network via the LTE network, and then call setup signaling between the legacy network and the UE can pass via the LTE network and LTE air interface. For instance, once the UE is registered with and served by the LTE network, the UE may transmit to its serving LTE base station a legacy-network registration message, and the LTE network may pass that registration message via an inter-network connection (e.g., via an interworking server) to the legacy network, so that the legacy network will record the fact that the UE is accessible via the LTE network. While the UE is then served by the LTE network, the UE may thus conveniently receive legacy-network page messages and engage in other legacy-network call-setup signaling via the LTE network.

Thus, while so served by the LTE network with this first approach, when the UE seeks to place a voice call, the UE transmits a legacy-network call-origination message to the UE's serving LTE base station, and the LTE network passes that call-origination message via the inter-network connection to the legacy network. Through possibly additional signaling between the legacy network and the UE via the LTE network, the legacy network may then set up the voice call and, when appropriate, signal to the UE via the LTE network to cause the UE to transition from being served by the LTE network to instead being served by the legacy network, and the UE may then engage in the call served by the legacy network via a legacy-network air interface.

Similarly with this first approach, when the legacy network has an incoming call to connect to the UE, the legacy network may transmit a legacy-network page message to the UE via the LTE network (via the inter-network connection) or otherwise direct the LTE network to transmit such a page message to the UE, which the UE would receive from its serving LTE base station via the LTE air interface. Here too, through possibly additional signaling between the legacy network and the UE via the LTE network, the legacy network may then set up the voice call and, when appropriate, signal to the UE via the LTE network to cause the UE to transition from being served by the LTE network to instead being served by the legacy network, and the UE may then engage in the call served by the legacy network via a legacy-network air interface.

In a second approach, on the other hand, the UE temporarily tunes away from the LTE network to the legacy network and transmits to a legacy-network base station a registration message, so that the legacy network will record the fact that the UE is accessible directly via the legacy network's air interface, and the UE then tunes back to the LTE network for default operation. Further, in this approach, while the UE is served by the LTE network via the LTE air interface, the UE periodically tunes away from the LTE network to the legacy network to check for any page messages from legacy network to the UE.

Thus, while so served by the LTE network with this second approach, when the UE seeks to place a voice call, the UE tunes away from the LTE network to the legacy network and transmits directly via the legacy-network air interface to a legacy-network base station a call origination message, and the legacy network may then set up and serve the UE with the call via the legacy-network air interface. And likewise, when the legacy network has an incoming call to connect to the UE, the legacy network transmits a page message to the UE via the legacy-network air interface, which the UE detects and responds to at one of the UE's periodic tune-aways from the LTE network to the legacy network, and the legacy network may then likewise set up and serve the UE with the call via the legacy-network air interface.

In some cases, when a UE is served by an LTE network, the UE may be configured to operate with either of these approaches so as to facilitate engaging in voice calls or other legacy network services. To operate with the first approach, the UE may register with the legacy network via the LTE network, forgo periodically tuning away from the LTE network to the legacy network, and engage in legacy-network call-setup signaling via the LTE network as discussed above. Whereas, to operate with the second approach, the UE may register directly with the legacy network and then periodically tune away from the LTE network to the legacy network to check for pages as discussed above, and engage in legacy-network call-setup signaling directly via the legacy-network air interface.

In general, when a media server streams media content to a UE, the first approach may be preferable to the second approach, since a user of a UE that is operating in the second approach may perceive a degradation of quality when the UE tunes away to check for pages. For instance, when a media server streams media content to the UE over the LTE network, each time the UE tunes away from the LTE network to the legacy network, the UE temporarily stops receiving bearer data from the media server over the LTE network. Such temporary disruptions in receiving bearer data may reduce LTE throughput. And if the UE does not receive bearer data quickly enough due to reduced LTE throughput, the tune-aways could lead to a noticeable degradation of media stream quality such as a media stream that stalls or buffers.

Further, the degradation of media stream quality may be more noticeable to the user of the UE when the media server streams high resolution media content to the UE than when the media server streams low resolution media content to the UE. By way of example, when the media server streams high resolution media content, the bit rate is higher than when the media server streams low resolution media content. And with a higher bit rate, there are more bits conveyed or streamed per unit of time as compared to the number of bits conveyed or streamed per unit of time with a lower bit rate. As a result, the likelihood of bearer data "backing up" and not getting through to the UE in time when the media server streams high resolution media content is greater than the likelihood of bearer data backing up and not getting through to the UE in time when the media server streams low resolution media content. Hence, the likelihood of degradations of media stream quality is greater when the media server streams high resolution content to the UE than the likelihood of degradations of media stream quality when the media server streams low resolution media content to the UE.

Ideally, to help ensure a positive user experience, a media server could be configured to stream media content to a UE at a bit rate that is adjusted in real time to be a highest bit rate that the UE's respective bandwidth availability and RF conditions currently support. This would allow the UE to always receive the highest quality (e.g., highest resolution and/or frame rate) streaming media content that their respective bandwidth availability and RF conditions currently support. Unfortunately, however, this streaming arrangement could present issues for any UEs operating with the hybrid-network second approach, since, as discussed above, for a UE that is operating with the second approach, the degradation of media stream quality may be more noticeable to the user of the UE when the media server streams high resolution media content to the UE than when the media server streams low resolution media content to the UE. Consequently, an improvement is desired.

To address this or possibly other concerns, the present disclosure provides for using the extent to which a UE is configured to tune away from a first RAN as a basis for establishing the bit rate at which a media server streams media content to the UE. As such, the disclosure draws a distinction between a UE that is served by a RAN and configured to periodically tune away from the RAN to check for pages, and a UE that is served by a RAN but is not configured to periodically tune away from the RAN. The theory here is that if a media server is streaming media content to a UE and the UE is configured to tune away from the RAN to check for pages, the UE's tuning away may impact the user experience of a user of the UE, and so it would be beneficial to limit the bit rate at which the media server streams media content to the UE, to help avoid a user perception of degradation in quality as a result of tuning away. Whereas, if a media server is streaming media content to a UE but the UE is not configured to tune away from the RAN to check for pages, a degradation in quality as a result of tuning away may not be an issue, so the UE could perhaps be permitted to receive streaming media content at a higher bit rate.

The disclosed process can work with respect to any two RANs, referred to as a first RAN and a second RAN. However, for illustration, and without restriction, the disclosure will focus on a scenario where the UE is served by an LTE network and would transition to a legacy CDMA network to engage in a voice call or other such service (generally a "call") served by the CDMA network. In that scenario, a UE operating in a circuit-switched fallback (CSFB) mode is an example of a UE operating with the first approach discussed above, and a UE operating in a non-CSFB mode, such as a single-radio-LTE (SR-LTE) mode, is an example of a UE operating with the second approach discussed above. Thus, a UE operating in a CSFB mode is an example of a UE that tunes away a first extent to check for pages (e.g., not at all), and a UE operating in a non-CSFB mode, such as in an SR-LTE mode, is an example of a UE that tunes away a second extent to check for pages (e.g., once every five seconds).

In accordance with the disclosure, a UE, the UE's serving base station, a media server, and/or another network entity could thus determine an extent to which a UE is configured to tune away from a first RAN to a second RAN to check for pages, and could then establish the bit rate based on the determined extent. Establishing the bit rate may involve determining or deciding what the bit rate should be. For instance, establishing the bit rate may involve selecting a bit rate from one of a plurality of predetermined bit rates or perhaps selecting a bit rate may involve applying a scaling factor to a baseline bit rate.

Determining the extent at issue could involve determining whether the UE is scheduled to periodically tune away from a first RAN to a second RAN to check for pages. For instance, determining the extent could involve determining whether the UE is operating in a mode such as an SR-LTE mode in which the UE periodically tunes away from the first RAN to the second RAN to check for pages, or rather is operating in a mode such as a CSFB mode in which the UE does not periodically tuning away.

In some examples, the UE itself could determine the extent to which the UE is configured to tune away from the first RAN to the second RAN to check for pages, and then the UE could establish the bit rate based on the determined extent. Alternatively, the UE could determine the extent to which the UE is configured to tune away from the first RAN to the second RAN to check for pages, and the UE could then send the determined extent to another network entity (e.g., the serving base station or a media server) to enable that other entity to establish the bit rate based on the determined extent.

In one example implementation, the UE or the serving base station could establish the bit rate, and after the UE or the serving base station establishes the bit rate, the UE or the serving base station could cause the media server to stream media content to the UE at the established bit rate. For instance, the UE or the serving base station could send a request to the media server, requesting that the media server stream media content to the UE at the established bit rate. The media server, in turn, could then stream media content to the UE at the established bit rate.

In another example implementation, the UE itself could establish the bit rate, and then carry out operations that cause the media server to stream media content to the UE at the established bit rate. For instance, the UE could send to the media server a request for streaming media content. In response to receiving the request, the media server could then send to the UE an index file identifying multiple versions of the media content that are each encoded at different bit rates and, for each of the multiple versions, identifying a respective bit rate at which the version is encoded. Based on the established bit rate, the UE could then select, using the index file, a particular version of the media content based on the particular version being encoded at the established bit rate. And the UE could request the particular version of the media content from the media server.

Further, in some examples, the UE, the UE's serving base station, the media server, or another network entity could take into account factors such as available bandwidth and RF conditions when establishing the bit rate at which the UE receives streaming media content.

Accordingly, disclosed herein is a method for controlling a bit rate at which a media server streams media content to a UE via a first RAN. The method may be carried out in a communication system in which the first RAN servers the UE over a first air interface. The method may involve determining an extent to which the UE is configured to tune away from the first RAN to a second RAN to check for pages via a second air interface. And the method may involve, based on the determined extent, (i) establishing the bit rate and (ii) causing the media server to stream the media content to the UE at the established bit rate.

In another respect, disclosed is a controller configured to control a bit rate at which a media server streams media content to a UE, with a first RAN serving the UE over a first air interface. The controller may include at least one processing unit. The controller may also include non-transitory data storage having encoded thereon instructions executable by the processing unit to carry out various operations. In particular, the operations may include determining an extent to which the UE is configured to tune away from the first RAN to a second RAN to check for pages via a second air interface. The operations may also include, based on the determined extent, (i) establishing the bit rate and (ii) causing the media server to stream the media content to the UE at the established bit rate.

Still further, in another respect, disclosed is a method carried out by a UE for controlling a bit rate at which a media server streams media content to the UE. The method may involve the UE being served by a first RAN over a first air interface. The method may also involve, while being served by the first RAN, the UE (i) determining an extent to which the UE is configured to tune away from the first RAN to a second RAN to check for pages via a second air interface and (ii) sending to the media server via the first RAN a request to stream media content to the UE at a bit rate corresponding to the determined extent, with the request specifying the determined extent. And the method may involve, responsive to the sending, the UE receiving media content from the media server at the bit rate corresponding to the determined extent.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified block diagram of a hybrid system in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
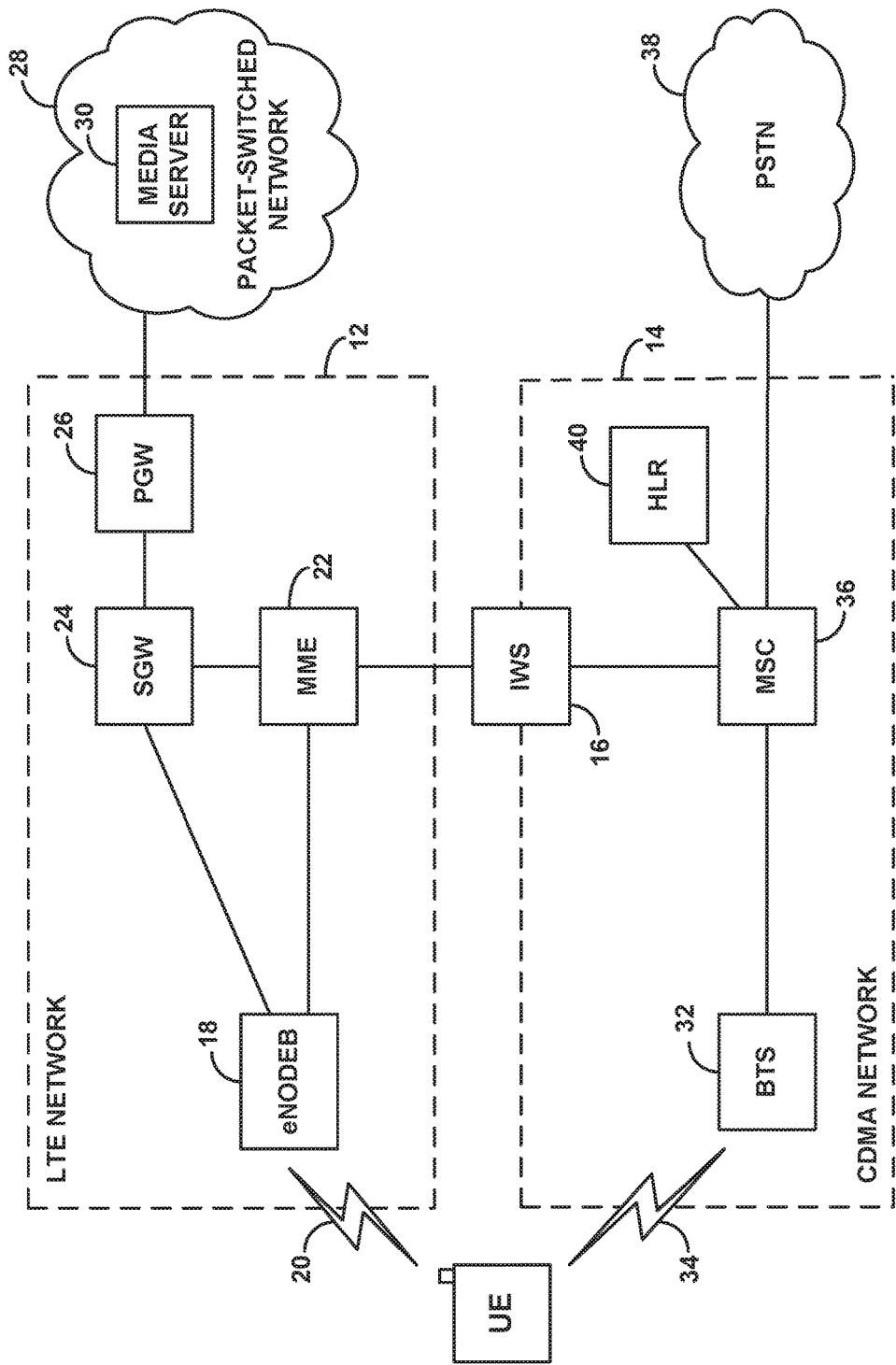
FIG. 1 is a simplified block diagram of a hybrid system in which features of the present disclosure can be implemented.

FIG. 1 depicts the hybrid system as including a representative LTE network 12 and a representative CDMA network 14. The LTE network primarily serves UEs with wireless packet-data communication service (including perhaps voice-over-packet service and other packet-based real-time media service), and the CDMA network primarily serves UEs with circuit-switched voice call service (but may also provide packet-data communication service and other types of service). Further, the hybrid system includes a representative interworking server (IWS) 16 interconnecting the networks, to facilitate exchange of signaling between the networks to facilitate CSFB operation as discussed above.

As shown by way of example, the LTE network 12 includes a representative LTE base station (evolved Node B (eNodeB)) 18, which includes an antenna structure and associated equipment for engaging in LTE communication over an LTE air interface defining an LTE coverage area 20. The eNodeB then has an interface with a mobility management entity (MME) 22 that serves as a signaling controller for the LTE network. Further, the eNodeB and MME each have a respective interface with a serving gateway (SGW) 24, which then has an interface with a packet data network gateway (PGW) 26 that provides connectivity with a packet-switched network 28. The packet-switched network 28, in turn, includes a representative media server 30 that sits as a node on the packet-switched network 28.

With this arrangement, when a UE enters into coverage of the eNodeB, the UE may transmit an access request to the eNodeB and engage in further signaling with the eNodeB to establish a Radio Resource Control (RRC) connection through which the UE and eNodeB can then engage in scheduled air interface communication. Through the RRC connection, the UE may then transmit an attach request to register with the LTE network, which the eNodeB would forward to the MME. And upon authenticating the UE, the MME would then engage in signaling with the eNodeB and SGW (and, in turn, the SGW engages in signaling with the PGW), to set up for the UE one or more bearers for carrying packet data between the UE and the packet-switched network 28. The UE may then be served by the LTE network in a connected mode or an idle mode.

The CDMA network 14, on the other hand, is shown including a representative CDMA base station (base transceiver station (BTS)) 32, which includes an antenna structure and associated equipment for engaging in CDMA communication over a CDMA air interface defining a coverage area 34 co-located at least in part with the LTE coverage area 20. The BTS then has an interface, possibly through a base station controller (not shown), with a mobile switching center (MSC) 36 that serves as a signaling controller and switch for the CDMA network and that provides connectivity with the PSTN 38. And the MSC has an interface with a home location register (HLR) 40 that stores location and profile information for UEs.

With this arrangement, normally when a UE enters into coverage of the BTS, the UE may register with the CDMA network by transmitting a CDMA registration message over the CDMA air interface to the BTS, which the BTS would forward to the MSC, and which the MSC may forward to the HLR. Upon authenticating the UE, the HLR and MSC may then establish a record that the UE is served by BTS 32, and the UE may be served by the CDMA network in an active mode or an idle mode. Thereafter, when a call comes in for the UE from the PSTN and the UE is in the idle mode, the MSC would page the UE by transmitting a CDMA page message to the BTS for transmission over the CDMA air interface, the UE would send a page response via the CDMA air interface, and the MSC would connect the call to the UE via the UE's serving BTS and the CDMA air interface.

In practice, a UE that is equipped for both LTE and CDMA service (e.g., having a radio and associated components for selectively engaging in LTE service or CDMA service) may be configured to prefer LTE service by default. Thus, when the UE shown in FIG. 1 is in coverage of both the LTE network and the CDMA network, the UE may register to be served by the LTE network as discussed above.

Further, in line with the discussion above, when the UE is served by the LTE network, the UE may then also operate by default in a CSFB mode to allow the UE to engage in voice calls or other service served by the CDMA network. To facilitate this, as discussed above, the UE may register with the CDMA network via the LTE network, by transmitting a CDMA registration message to the LTE eNodeB, which would then pass to the MME and in turn via the IWS to the MSC. Upon authenticating the UE, the HLR and MSC may then establish a record that the UE is served by the LTE network via the IWS (rather than via a CDMA BTS), so that CDMA paging of the UE would then pass via the LTE network.

Thus, in the CSFB mode, when a call comes in for the UE from the PSTN, the MSC would page the UE by transmitting a CDMA page message or associated trigger via the IWS to the MME, which would cause the LTE eNodeB to transmit the CDMA page message over the LTE air interface to the UE. Upon receipt of this CDMA page message, the UE may then engage in further CDMA call setup signaling with the MSC via the LTE network, and the UE may then ultimately transition from being served by the LTE network over the LTE air interface to being served by the CDMA network over the CDMA air interface, and to engage in the call served by the CDMA network via the CDMA air interface.

Alternatively, also in line with the discussion above, when the UE is served by the LTE network, the UE may operate in a non-CSFB mode (e.g., an SR-LTE mode) to allow the UE to engage in voice calls or other service served by the CDMA network. To facilitate this, as discussed above, while the UE is served by the LTE network, the UE may temporarily tune away from the LTE network (i.e., in wireless communication with the LTE eNodeB) to the CDMA network (i.e., in wireless communication with the CDMA BTS) and register directly with the CDMA network, by transmitting a CDMA registration request to the CDMA BTS, so that the CDMA network would become set to page the UE via the CDMA air interface rather than via the LTE network. Upon so registering directly with the CDMA network, the UE may then tune back to the LTE network. Further, as the UE is then served by the LTE network, the UE would then periodically tune away from the LTE network to the CDMA network (e.g., at scheduled paging occasions) to check for any page messages to the UE from the CDMA network and, upon finding such a page message, would respond via the CDMA air interface.

Thus, in the non-CSFB (e.g., SR-LTE) mode, when a call comes in for the UE from the PSTN, the MSC would page the UE by transmitting a CDMA page message via the CDMA air interface to the UE, and after possibly further signaling with the UE via the CDMA air interface, the MSC may then connect the call through to the UE via the CDMA air interface.

In the hybrid system of FIG. 1, the media server 30 may function to store and communicate streaming media content (such as voice, audio, video, or the like) to various devices, such as a UE that is served by the LTE network of the CDMA network. To facilitate adaptive bit rate streaming of a particular instance of media content, media server (or another entity) may encode various versions of the particular instance of media content, with each version having a different bit rate. By way of example, the media server may store an original version of a video that is of 1080p resolution and a frame rate of 60 frames per second (fps). Ordinarily, a bit rate of about 4,500-9,000 kilobytes per second (kbps) may be recommended to stream the original version of the video. To facilitate adaptive bit rate streaming, media server may also encode one or more downgraded versions of the video. For instance, the media server may encode a first downgraded version of the video with a resolution of 480 p and a frame rate of 30 fps. A lesser bit rate of about 500-2,000 kbps may be sufficient to stream the first downgraded version of the video. The media server may also encode a second downgraded version of the video with a resolution of 240 p and a frame rate of 30 fps. An even lesser bit rate of less than 500 kbps may be sufficient to stream the second downgraded version.

The media server (or another entity) may also segment each of the different encoded versions of an instance of media content into multi-second segments. For example, continuing with the example of the video above, the media server may segment the original version of the video into two-second media segments, segment the first downgraded version of the video into two-second media segments, and segment the second downgraded version of the video into two-second media segments. The size of the media segments may vary depending on the desired implementation. For instance, rather than segmenting the encoded versions into two-second media segments, the media server may segment the encoded versions into four-second media segments or ten-second media segments. The individual media segments of a version may be stored individually within respective individual files or the individual media segments of a version may be stored together within a single file.

Further, the media server may create an index file for each instance of media content. As an example, an index file for a particular instance of media content may identify multiple versions of the index file that are each encoded at different bit rates and, for each of the multiple versions, a respective bit rate at which the version is encoded. Further, the index file may identify the multi-second segments of each version.

In operation, the media server may stream to a UE individual segments from appropriate version(s) of the video. The media server may select the individual segments based on a desired bit rate. For instance, initially, the media server may, by default, be arranged to stream segments from a lowest bit rate version, such as the second downgraded version of the original video. If it is subsequently determined (e.g., by the media server) that the device can support a higher bit rate, the media server may switch to streaming to the device individual segments from a higher bit rate version, such as the first downgraded version of the original video. Further, if at later time it is determined that the device can no longer support the higher bit rate (e.g., due to deteriorating RF conditions), the media server may transition to streaming to the device segments from a lower bit rate version.

More specifically, in a server-driven adaptive bit rate streaming implementation, a device may request streaming content from the media server using one or more commands, processes, and procedures that are governed by a streaming protocol, such as Real-time Transport Protocol/Real-Time Streaming Protocol (RTP/RTSP), HTTP Live Streaming (HLS), HTTP Dynamic Streaming, and Smooth Streaming. The media server may then deliver particular segments of one or more versions of the media content to the device, selecting the particular segments from one version or another according to the desired bit rate. For instance, if the media server receives data indicating that a highest bit rate is desired, the media server may deliver segments from an original version of the media content to the device. However, if the media server later receives data indicating that a lesser bit rate is desired, the media server may switch to delivering segments from a downgraded version of the media content to the device.

Alternatively, in another implementation, the UE itself may carry out operations that cause the UE to receive streaming media content at a particular bit rate. For instance, in a client-drive adaptive bit rate streaming implementation, a UE may similarly request content from the media server using one or more commands, processes, and procedures that are governed by a streaming protocol. Upon receiving a request for media content, the media server may then inform the UE of the available versions of the media content and the individual segments of the available versions. For instance, the media server may send to the device an index file identifying the addresses (e.g., uniform resource locators (URLs)) of each available version and also identifying the respective bit rate at which each version is encoded. The device can then determine an appropriate bit rate (e.g., based on the device's wireless conditions), and use the index file to select and request the appropriate media segments.

With the arrangement of FIG. 1, in line with the discussion above, the present disclosure provides for using the extent to which a UE is configured to tune away from a RAN as a basis for establishing the bit rate at which a media server streams media content to the UE. For instance, if a UE is served by a first RAN and is configured to tune away from the first RAN to check for pages, then the UE, the UE's serving base station, or the media server may establish a first bit rate and cause the media server to stream media content to the UE at the first bit rate. Whereas, if a UE is served by a first RAN but is not configured to tune away from the first RAN to check for pages, then the UE, the UE's serving base station, or the media server could establish a second bit rate that is higher than the first bit rate and cause the media server to stream media content to the UE at the second bit rate.

To do this in practice, the UE, the UE's serving base station, or the media server could be programmed with logic executable to determine the extent to which the UE is configured to tune away from a first RAN to a second RAN to check for pages. For instance, the UE could determine the extent by referring to configuration data that indicates the extent to which the UE is configured to tune away from a first RAN to a second RAN to check for pages. As an example, the UE could refer to configuration data stored in a memory of the UE that indicates how often the UE is configured to tune away from the first RAN to the second RAN to check for pages and/or how long the UE is tuned away in each instance. Or the UE could refer to configuration data that indicates whether the UE is operating in a mode such as an SR-LTE mode in which the UE periodically tunes away from the first RAN to the second RAN to check for pages, or rather is operating in a mode such as a CSFB mode in which the UE does not periodically tuning away.

Similarly, the UE's serving base station could determine the extent by referring to data that indicates the extent to which the UE is configured to tune away from a first RAN to a second RAN to check for pages. As one example, the UE's serving base station could refer to profile information for the UE that indicates how often the UE is configured to tune away from the first RAN to the second RAN to check for pages and/or how long the UE is tuned away in each instance. Or the UE's serving base station could refer to profile information for the UE that indicates whether the UE is operating in a mode such as an SR-LTE mode in which the UE periodically tunes away from the first RAN to the second RAN to check for pages, or rather is operating in a mode such as a CSFB mode in which the UE does not periodically tuning away.

The media server, on the other hand, could determine the extent by referring to data that is received from the UE or the UE's serving base station. For instance, the received data could indicate how often the UE is configured to tune away from the first RAN to the second RAN to check for pages and/or how long the UE is tuned away in each instance. Or the received data could indicate whether the UE is operating in a mode such as an SR-LTE mode in which the UE periodically tunes away from the first RAN to the second RAN to check for pages, or rather is operating in a mode such as a CSFB mode in which the UE does not periodically tuning away, and the UE or the UE's serving base station could be configured to send such data to the media server when the UE initially requests to receive streaming media content. Further, as the UE receives streaming media content, the UE or the UE's serving base station could be configured to update the media server if the extent to which the UE is configured to tune away from the first RAN to the second RAN changes. For instance, the UE or the UE's serving base station could be programmed with logic that causes the UE or the UE's serving base station to send an update to the media server if and when the extent to which the UE is configured to tune away to check for pages changes or changes by more than a threshold amount, and the update could include data indicating the latest extent.

In addition, the UE, the UE's serving base station, or the media server could be programmed with mapping data that correlates various bit rates with various extents to which a UE is configured to tune away from a first RAN to a second RAN to check for pages. Thus, the UE, the UE's serving base station, or the media server could determine the extent to which the UE is configured to tune away from the first RAN to the second RAN and could then refer to the mapping data so as to establish a bit rate for the UE.

If the UE establishes the bit rate, the UE could then transmit to the media server a control message interpretable by the media server to cause the media server to stream media content to the UE at the established bit rate. Alternatively, in a client-driven adaptive bit rate streaming implementation, after establishing the bit rate, the UE could carry out various operations to cause the media server to stream media content to the UE at the established bit rate. For instance, the UE could select, using an index file, a version of the media content having the established bit rate, and then request the selected version from the media server.

If the UE's serving base station establishes the bit rate, the base station could similarly then transmit to the media server a control message interpretable by the media server to cause the media server to stream media content to the UE at the established bit rate. Alternatively, in a client-driven adaptive bit rate streaming implementation, after establishing the bit rate, the base station could transmit to the UE a control message. The control message could be interpretable by the UE to cause the UE to cause the media server to stream media content to the UE at the established bit rate. For instance, the control message to the UE could identify the established bit rate, and the control message could be interpretable by the UE to cause the UE to then select and request a version of the media content having the established bit rate.

If the media server establishes the bit rate, the media server could then proceed to stream media content to the UE at the established bit rate. For instance, the media server could select a version of the media content having the established bit rate, and the media server could then communicate the selected version to the UE.

Figure 2:
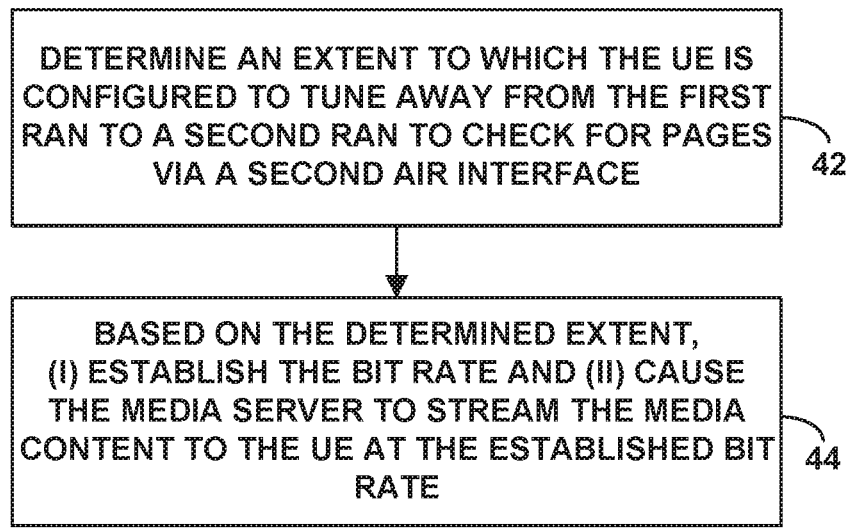
FIG. 2 is a flow chart depicting operations that can be carried out in accordance with the present disclosure.

FIG. 2 is next a flow chart depicting some of these operations, to facilitate controlling the bit rate at which a media server streams media content to a UE via a first RAN, where the first RAN serves the UE over a first air interface.

As shown in FIG. 2, at block 42, the method includes determining an extent to which the UE is configured to tune away from the first RAN to a second RAN to check for pages via a second air interface. And at block 44, the method then includes, based on the determined extent, (i) establishing the bit rate and (ii) causing the media server to stream media content to the UE at the established bit rate.

In line with the discussion above, in this method, the act of determining the extent to which the UE is configured to tune away from the first RAN to the second RAN to check for pages via the second air interface could involve determining whether the UE is scheduled to periodically tune away from the first RAN to the second RAN to check for pages via the second air interface (e.g., whether the UE is operating in a mode in which the UE periodically tunes away from the first RAN to the second RAN to check for pages). And the act of establishing the bit rate could involve establishing as the bit rate (i) a first bit rate if the determination is that the UE is scheduled to periodically tune away from the first RAN to the second RAN to check for pages via the second air interface and (ii) a second bit rate if the determination is that the UE is not scheduled to periodically tune away from the first RAN to the second RAN to check for pages via the second air interface, with the first bit rate being lower than the second bit rate.

In addition, as discussed above, the media server may have multiple bit rate versions of the media content. Accordingly, causing the media server to stream the media content to the UE at the established bit rate may involve causing the media server to stream a particular version of the media content to the UE that is encoded at the established bit rate. As a particular example, the media server may have multiple versions of a video, where each version is encoded at a different combination of resolution and frame rate, and causing the media server to stream the media content to the UE at the established bit rate may involve causing the media server to stream to the UE a particular version of the video, where the particular version of the video is encoded at a particular combination of resolution and frame rate corresponding to the established bit rate.

Further, in this method, causing the media server to stream the media content to the UE at the established bit rate could involve causing the media server to switch from streaming to the UE a first version of the media content that is encoded at a first bit rate to streaming to the UE the particular version of media content that is encoded at the established bit rate, with the established bit rate being different from the first bit rate. For instance, for a UE that is capable of operating in both a CSFB mode and an SRTLE mode, the media server could adjust the bit rate over time as the UE switches between the CFSB mode and the SR-LTE mode.

Figure 3:
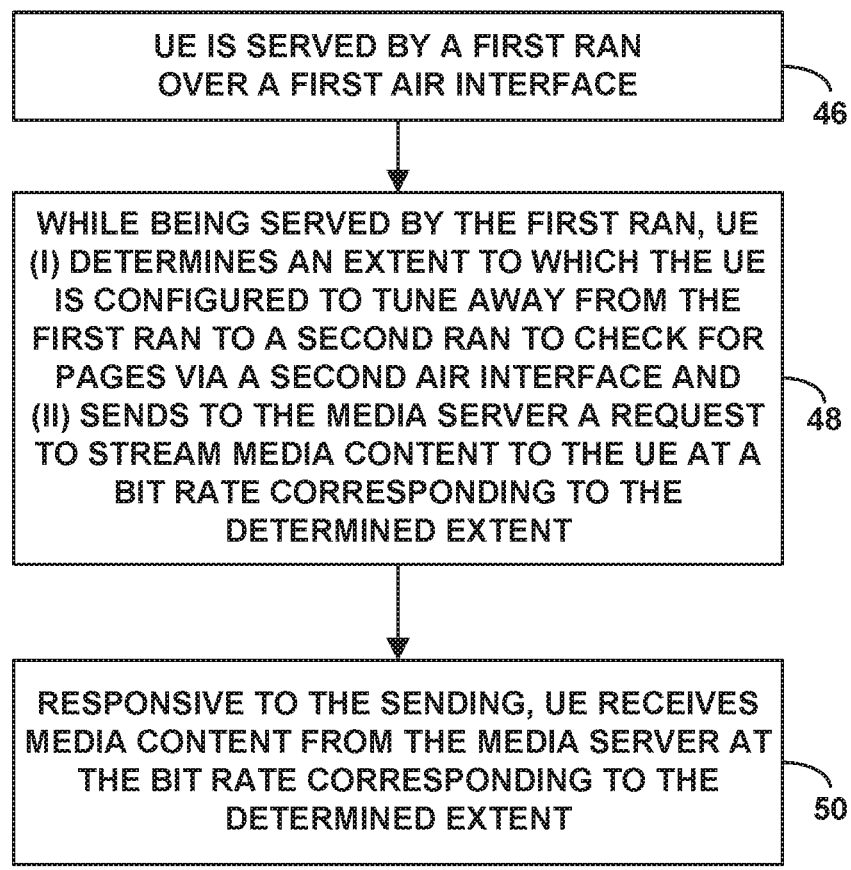
FIG. 3 is another flow chart depicting operations that can be carried out in accordance with the disclosure.

FIG. 3 is next another flow chart depicting a method in line with the discussion above, to facilitate controlling the bit rate at which a media server streams media content to a UE. As shown in FIG. 3, at block 46, the UE is served by a first RAN over a first air interface. At block 48, the method then involves, while being served by the first RAN, the UE (i) determining an extent to which the UE is configured to tune away from the first RAN to a second RAN to check for pages via second air interface and (ii) sending to the media server a request to stream media content to the UE at a bit rate corresponding to the determined extent. And at block 50, the method then involves, responsive to the sending, the UE receiving media content from the media server at the bit rate corresponding to the determined extent.

In line with the discussion above, in this method, the act of determining the extent to which the UE is configured to tune away from the first RAN to the second RAN to check for pages via the second air interface could involve determining whether the UE is scheduled to periodically tune away from the first RAN to the second RAN to check for pages via the second air interface (e.g., whether the UE is operating in a mode in which the UE periodically tunes away from the first RAN to the second RAN to check for pages).

In addition, in this method, the request that the UE sends to the media server could specify the determined extent, such that the media server can establish the bit rate based on the determined extent. For instance, the request that the UE sends to the media server could specify how often the UE is scheduled to tune away from the first RAN to the second RAN to check for pages or specify whether the UE is operating in a mode in which the UE periodically tunes away from the first RAN to the second RAN to check for pages.

Figure 4:
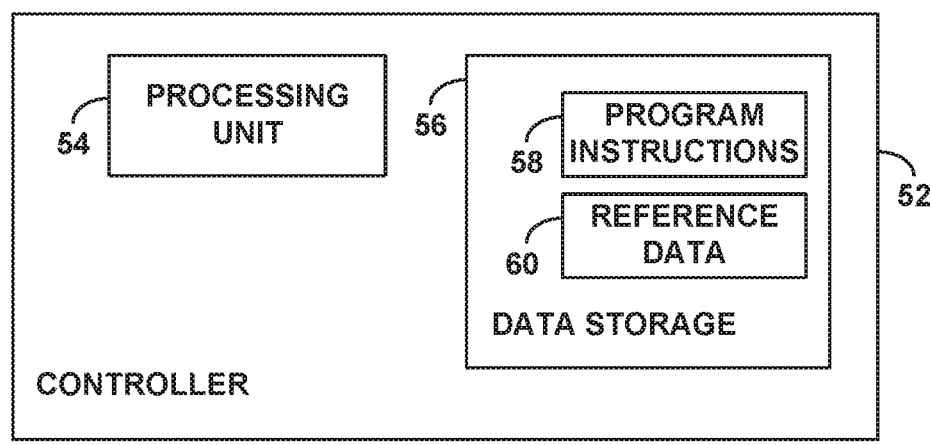
FIG. 4 is a simplified block diagram of an example controller operable in accordance with the present disclosure.

Finally, FIG. 4 is a simplified block diagram of a controller 52, showing some of the components that such a device could include in accordance with an example implementation. The controller could be a component of a UE, a base station, or a media server. As such, the controller could be configured to control operation of a UE, base station, or media server including implementing various UE, base station, or media server operations described herein, such as (i) determining an extent to which the UE is configured to tune away from a first RAN to a second RAN to check for pages and (ii) based on the determined extent, establishing the bit rate and causing the media server to stream the media content to the UE at the established bit rate.

As shown by way of example, the controller could include a processing unit 54 and non-transitory data storage 56. Processing unit 54 could comprise one or more general purpose processors (e.g., microprocessors) and/or one or more special-purpose processors (e.g., application specific integrated circuits or digital signal processors). And data storage 56 could comprise one or more volatile and/or non-volatile storage components, such as magnetic, optical, or flash memory, and could hold or be encoded with program instructions 58 and reference data 60. Program instructions 58 could be executable by processing unit 54 to carry out various UE, base station, or media server operations described herein, and reference data could include various data to facilitate carrying out the operations. For instance, reference data 60 could include data indicating respective extents to which a UE is configured to tune away from a first RAN to a second RAN to check for pages, and mapping data the correlates various bit rates with particular extents to which a UE is configured to tune away from a first RAN to a second RAN to check for pages.

Exemplary embodiments have been described above. Those skilled in the art will understand, however, that changes and modifications may be made to these embodiments without departing from the true scope and spirit of the invention.

We claim:

1. In a communication system in which a first radio access network (RAN) serves a user equipment device (UE) over a first air interface, a method for controlling a bit rate at which a media server streams media content to the UE via the first RAN, the method comprising:

determining an extent to which the UE is configured to tune away from the first RAN to a second RAN to check for pages via a second air interface; and
based on the determined extent, (i) establishing the bit rate and (ii) causing the media server to stream the media content to the UE at the established bit rate.

2. The method of claim 1, wherein the media server has multiple bit rate versions of the media content, and wherein causing the media server to stream the media content to the UE at the established bit rate comprises causing the media server to stream a particular version of the media content to the UE that is encoded at the established bit rate.

3. The method of claim 2, wherein causing the media server to stream the media content to the UE at the established bit rate comprises causing the media server to switch from streaming a first version of the media content to the UE that is encoded at a first bit rate to streaming the particular version of media content to the UE, wherein the established bit rate is different from the first bit rate.

4. The method of claim 1, wherein the media server has multiple versions of a video, wherein each of the multiple versions is encoded at a different combination of resolution and frame rate, and wherein causing the media server to stream the media content to the UE at the established bit rate comprises causing the media server to stream to the UE a particular version of the video, wherein the particular version of the video is encoded at a particular combination of resolution and frame rate corresponding to the established bit rate.

5. The method of claim 1, wherein determining the extent to which the UE is configured to tune away from the first RAN to the second RAN to check for pages via the second air interface comprises determining whether the UE is scheduled to periodically tune away from the first RAN to the second RAN to check for pages via the second air interface.

6. The method of claim 5, wherein establishing the bit rate comprises establishing as the bit rate (i) a first bit rate if the determination is that the UE is scheduled to periodically tune away from the first RAN to the second RAN to check for pages via the second air interface and (ii) a second bit rate if the determination is that the UE is not scheduled to periodically tune away from the first RAN to the second RAN to check for pages via the second air interface, wherein the first bit rate is lower than the second bit rate.

7. The method of claim 5, wherein determining whether the UE is scheduled to periodically tune away from the first RAN to the second RAN to check for pages via the second air interface comprises determining whether the UE is operating in a mode in which, while the UE is served by the first RAN via the first air interface, (i) the UE is registered directly with the second RAN so that when the second RAN pages the UE for a call to be served by the second RAN, the UE receives the page via the second air interface, and (ii) the UE periodically tunes away from the first RAN to the second RAN to check for pages via the second air interface.

8. The method of claim 7, wherein the mode is a Single-Radio Long Term Evolution (SR-LTE) mode.

9. The method of claim 1:
wherein a base station of the first RAN serves the UE over the first air interface,
wherein the method is carried out by a controller of the media server, and
wherein determining the extent to which the UE is configured to tune away from the first RAN to the second RAN to check for pages via the second air interface comprises receiving from the base station data indicative of the extent to which the UE is configured to tune away from the first RAN to the second RAN to check for pages via the second air interface.

10. The method of claim 1:
wherein a base station of the first RAN serves the UE over the first air interface,
wherein the method is carried out by a controller of the base station, and
wherein causing the media server to stream the media content to the UE at the established bit rate comprises sending to the media server a request to stream the media content to the UE at the established bit rate.

11. The method of claim 1:
wherein the method is carried out by the UE, and
wherein causing the media server to stream the media content to the UE at the established bit rate comprises sending to the media server a request to stream the media content to the UE at the established bit rate.

12. The method of claim 11, further comprising receiving an index file identifying: (i) multiple versions of the media content that are each encoded at different bit rates and (ii) for each of the multiple versions, a respective bit rate at which the version is encoded,
wherein causing the media server to stream the media content to the UE at the established bit rate comprises: (i) selecting, using the index file, a particular version of the media content based on the particular version being encoded at the established bit rate and (ii) requesting from the media server the particular version of the media content.

13. A controller configured to control a bit rate at which a media server streams media content to a user equipment device (UE), wherein a first radio access network (RAN) serves the UE over a first air interface, the controller comprising:
at least one processing unit; and
non-transitory data storage having encoded thereon instructions executable by the processing unit to carry out operations comprising:
determining an extent to which the UE is configured to tune away from the first RAN to a second RAN to check for pages via a second air interface, and
based on the determined extent, (i) establishing the bit rate and (ii) causing the media server to stream the media content to the UE at the established bit rate.

14. The controller of claim 13, wherein the media server has multiple bit rate versions of the media content, and wherein causing the media server to stream the media content to the UE at the established bit rate comprises causing the media server to stream a particular version of the media content to the UE that is encoded at the established bit rate.

15. The controller of claim 13, wherein determining the extent to which the UE is configured to tune away from the first RAN to the second RAN to check for pages via the second air interface comprises determining whether the UE is scheduled to periodically tune away from the first RAN to the second RAN to check for pages via the second air interface.

16. The controller of claim 15, wherein establishing the bit rate comprises establishing as the bit rate (i) a first bit rate if the determination is that the UE is scheduled to periodically tune away from the first RAN to the second RAN to check for pages via the second air interface and (ii) a second bit rate if the determination is that the UE is not scheduled to periodically tune away from the first RAN to the second RAN to check for pages via the second air interface, wherein the first bit rate is lower than the second bit rate.

17. The controller of claim 15, wherein determining whether the UE is scheduled to periodically tune away from the first RAN to the second RAN to check for pages via the second air interface comprises determining whether the UE is operating in a mode in which, while the UE is served by the first RAN via the first air interface, (i) the UE is registered directly with the second RAN so that when the second RAN pages the UE for a call to be served by the second RAN, the UE receives the page via the second air interface, and (ii) the UE periodically tunes away from the first RAN to the second RAN to check for pages via the second air interface.

18. A method carried out by a user equipment device (UE) for controlling a bit rate at which a media server streams media content to the UE, the method comprising:

the UE being served by a first radio access network (RAN) over a first air interface;

while being served by the first RAN, the UE (i) determining an extent to which the UE is configured to tune away from the first RAN to a second RAN to check for pages via a second air interface and (ii) sending to the media server via the first RAN a request to stream media content to the UE at a bit rate corresponding to the determined extent, the request specifying the determined extent; and responsive to the sending, the UE receiving media content from the media server at the bit rate corresponding to the determined extent.

19. The method of claim 18, wherein determining the extent to which the UE is configured to tune away from the first RAN to the second RAN to check for pages via the second air interface comprises determining whether the UE is scheduled to periodically tune away from the first RAN to the second RAN to check for pages via the second air interface.

20. The method of claim 19, wherein determining whether the UE is scheduled to tune away from the first RAN to the second RAN to check for pages via the second air interface comprises determining whether the UE is operating in a mode in which, while the UE is served by the first RAN via the first air interface, (i) the UE is registered directly with the second RAN so that when the second RAN pages the UE for a call to be served by the second RAN, the UE receives the page via the second air interface, and (ii) the UE periodically tunes away from the first RAN to the second RAN to check for pages via the second air interface.

* * * * *